United States Patent
Loewen

(10) Patent No.: US 10,461,552 B2
(45) Date of Patent: Oct. 29, 2019

(54) MOBILE DEVICE CHARGER

(71) Applicant: Joanne Loewen, Lutz, FL (US)

(72) Inventor: Joanne Loewen, Lutz, FL (US)

(73) Assignee: BIBICORD, INC., Lutz, FL (US)

( * ) Notice: Subject to any disclaimer, the term of this patent is extended or adjusted under 35 U.S.C. 154(b) by 0 days.

(21) Appl. No.: 15/197,413

(22) Filed: Jun. 29, 2016

(65) Prior Publication Data

US 2016/0380446 A1    Dec. 29, 2016

Related U.S. Application Data

(60) Provisional application No. 62/185,870, filed on Jun. 29, 2015.

(51) Int. Cl.
 *H02J 7/00* (2006.01)

(52) U.S. Cl.
 CPC .......... *H02J 7/0052* (2013.01); *H02J 7/0042* (2013.01)

(58) Field of Classification Search
 USPC ........................................ 320/107
 See application file for complete search history.

(56) References Cited

U.S. PATENT DOCUMENTS

| | | | |
|---|---|---|---|
| 6,803,525 B1 | 10/2004 | Liao | |
| 7,151,356 B1 * | 12/2006 | Chen | G06F 1/263 320/107 |
| 7,563,130 B2 * | 7/2009 | Farrar | B65H 75/06 320/111 |
| 2003/0117104 A1 * | 6/2003 | Liao | H02J 7/0042 320/107 |
| 2005/0193862 A1 * | 9/2005 | Suzuki | C21B 13/00 75/469 |
| 2005/0236243 A1 * | 10/2005 | Huang | H02G 11/02 191/12.4 |
| 2005/0269987 A1 | 12/2005 | Lin | |
| 2006/0083032 A1 * | 4/2006 | McDonald | H02M 3/33592 363/21.12 |
| 2011/0159935 A1 | 6/2011 | Gavara | |
| 2012/0262067 A1 * | 10/2012 | Tam | H05B 33/0845 315/119 |
| 2014/0126230 A1 * | 5/2014 | Harris | A45C 13/30 362/382 |

FOREIGN PATENT DOCUMENTS

| | | | | |
|---|---|---|---|---|
| CN | 203086189 | * | 7/2013 | ............... H02J 7/00 |
| GB | 2507712 A | | 5/2014 | |
| JP | 3193395 U | | 10/2014 | |
| RU | 61947 U1 | | 3/2007 | |

\* cited by examiner

*Primary Examiner* — Samuel Berhanu

(74) *Attorney, Agent, or Firm* — Gary L. Eastman, Esq.; Eastman McCartney Dallmann LLP

(57) ABSTRACT

A mobile device charger with a folding electrical plug and a battery on a key chain with a retractable cord is disclosed. Our invention allows the user to charge their mobile device either from the battery or using an electrical outlet while it is still attached to their bag so that they do not forget it in the outlet. Our invention allows the user to protect the cord and the metal tip used to charge mobile devices because the cord and metal tip retracts into the protective housing.

13 Claims, 5 Drawing Sheets

MOBILE DEVICE CHARGER

RELATED APPLICATIONS

This application claims the benefit of priority to the United States Provisional Patent Application for "A mobile device charger—called a Bibicord—with a folding electrical plug and an optional battery on a key chain with a retractable cord," Ser. No. 62/185,870 filed on Jun. 29, 2015.

FIELD OF THE INVENTION

The present invention pertains generally to chargers for mobile electronic devices. More particularly, the present invention pertains to a mobile device charger with a mechanism for convenient storage of the cable and increased portability of the charger, and attachment of the charger to a purse or backpack. The present invention is particularly, but not exclusively, useful as a personal electronic device charger for persons temporarily in places away from home.

BACKGROUND OF THE INVENTION

Mobile device charger cords and metal tips are exposed to damage because they are not protected. In addition, people leave mobile device chargers at home and in hotel rooms, resulting in loss of the charger and depletion of the battery within the device.

Existing electric mobile device chargers do not attach to anything else via a clip/key chain. Existing electric mobile device chargers do not have batteries built into them. They are disorganized, easily forgotten and easily broken. The present invention allows the user to charge their mobile device either from the battery or using an electrical outlet while it is still attached to their bag so that they do not forget it in the outlet.

The present invention allows the user to protect the cord and the metal tip used to charge mobile devices because the cord and metal tip retracts into the protective housing.

Mobile device chargers provide a means for charging the batteries of personal electronic devices by connecting them to a power source. The power source to which a mobile device charger connects is generally either a standard power outlet in a building or a vehicle's power source through a cigarette lighter outlet or dedicated charging port.

Mobile device chargers currently offered for sale are easily damaged. The cords and connectors are not protected by the charger itself, and so they often sustain damage through exposure to people, pets, or other objects. Additionally, currently available mobile device chargers are often accidentally left at home or away from home in places where the owner was using them, such as offices or hotel rooms. Thus, special care must be taken to avoid damage or loss of currently available mobile device chargers.

SUMMARY OF THE INVENTION

In light of the above, it would be advantageous to provide a device for charging portable electronic devices that is durable, easy to use, and comparatively cost effective.

One object of the present invention is convenient portability and storage of a mobile device charger. Another object of the present invention is the avoidance of damage to a mobile device charger or loss of the charger.

As stated above, mobile device charger cords and metal tips are exposed to damage because they are not protected. In addition, people leave mobile device chargers at home and in hotel rooms. The invention claimed here solves this problem.

The present invention, called a "Bibicord", can be attached to a backpack, purse or computer bag so that people do not forget them. It can stay attached even when charging the mobile device. Also, the present invention allows the charging cord and the metal tip to retract into the protective housing when not in use to protect them from damage.

The claimed invention differs from what currently exists. The present invention allows the user to charge their mobile device either from the internal battery or using an electrical outlet while it is still attached to their bag so that they do not forget it in the outlet.

The present invention allows the user to protect the cord and the metal tip used to charge mobile devices because the cord and metal tip retracts into the protective housing.

This invention is an improvement on what currently exists. The present invention allows the user to charge their mobile device either from the battery or using an electrical outlet while it is still attached to their bag so that they do not forget it in the outlet.

Existing mobile device chargers do not have a clip on them to allow them to be attached to anything else, so they are easily forgotten. Existing mobile device charger cords and metal tips are often damaged because they are exposed.

The present invention includes a clip, a chain, a cord housing, a battery, a retractable cord with charger tip, and a folding electrical outlet plug.

The present invention consists of a protective enclosure containing a transformer and AC/DC converter circuit and a retractable cable with a connector at the end. The connector plugs into a mobile device in order to provide current from the transformer and AC/DC converter circuit to the mobile device. When the invention is not in use, the enclosure protects the retracted cable and its connector, thus avoiding damage to the mobile device charger.

The enclosure on the present invention includes a connector for a chain. In one embodiment, this is a recessed part of the enclosure in which one side of the enclosure connects to the opposite side over the recess via a bridge or rod extending across the recess. A chain may be attached to the bridge or rod. In an alternative embodiment, the enclosure is extended on one end and the connector consists of an opening in the extension through which a chain may be connected. A clip or keychain may thus be attached to the enclosure through a cord or chain. By attaching the invention to another object via the clip, loss of the mobile device charger can be avoided.

A preferred embodiment of the present invention uses a flyback controller on the primary side of the transformer and a synchronous rectifier circuit on the secondary side. The flyback controller switches the rectified main current through the primary side of the transformer at approximately 80 kHz. The switching speed is dithered to lessen harmonic content and ease EMI compliance. The resulting current is monitored by the flyback controller on an auxiliary winding on the primary side of the transformer, allowing the controller to protect against over-voltage and over-current conditions and the current to be monitored entirely on the primary side of the transformer. The secondary side of the transformer contains a synchronous rectifier circuit in place of the traditional diode, greatly improving the efficiency during use by removing the voltage/power loss across the diode. Further, when the load is removed entirely, a monitor circuit issues a special set of pulses through the transformer indicating to the primary-side flyback controller that there is no load, causing it to enter a low-power standby mode. This feature results in virtually zero standby power when the adapter is not connected to a device.

A preferred embodiment of the present invention includes a foldable plug that sits flush with the enclosure when folded in, but may be extended in order to connect to a power source. In one variation of said embodiment, a recess around the folded plug allows easy access to the plug in order to extend it. In another variation, the ends of the plug's prongs, when folded in, sit against the edge of the enclosure, allowing extension by grasping the end of said prongs and pulling outward via a motion of the hand against the edge of the enclosure. By folding in the plug so that it sits flush with the enclosure, the mobile device charger may be easily transported in a pocket or a purse without damaging other objects stored with it.

Also, a preferred embodiment of the present invention uses a cylindrical enclosure with rounded or beveled edges which allow it to easily be carried in a pocket or a purse without damaging other objects stored with it.

A battery is included inside the enclosure in an embodiment of the present invention, thus allowing the mobile device charger to provide current to a mobile device when no outside power source is available.

The Components are related as follows: The clip and chain attach to the cord housing, the cord housing holds the retractable cord and the optional battery, the retractable cord allows the cord to coil into the housing, the housing holds the folding electrical outlet plug on the back, and, finally, the housing holds a picture, statement, words or a logo as well. The clip and chain could be removed from the cord housing if desired.

The Invention Works as follows: The retractable cord element allows the cord to coil into a compact space so it is protected by the housing. The housing element has the folding electrical outlet plug element built into it so the user can access electricity to charge mobile devices. The housing element holds a battery as well so that the user can charge the battery and use the battery to charge their mobile device when electricity is not available. The housing element has a clip on a chain attached to it so that the unit can be attached and stay attached to a purse, computer bag to backpack even while it is charging a device.

To use the invention, a person would attach the mobile device charger to their bag or purse. A person would charge a mobile device and the battery by plugging the mobile device charger into an electrical outlet and inserting the metal charging tip into a device, while keeping it attached to their travel bag or back pack. A person would also charge their mobile device using an optional internal battery as an energy source when electricity is not available. A person would retract the cord and metal tip into the housing when he/she is not using the cord and carry it on their bag, purse or backpack so they have it with them at all times.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
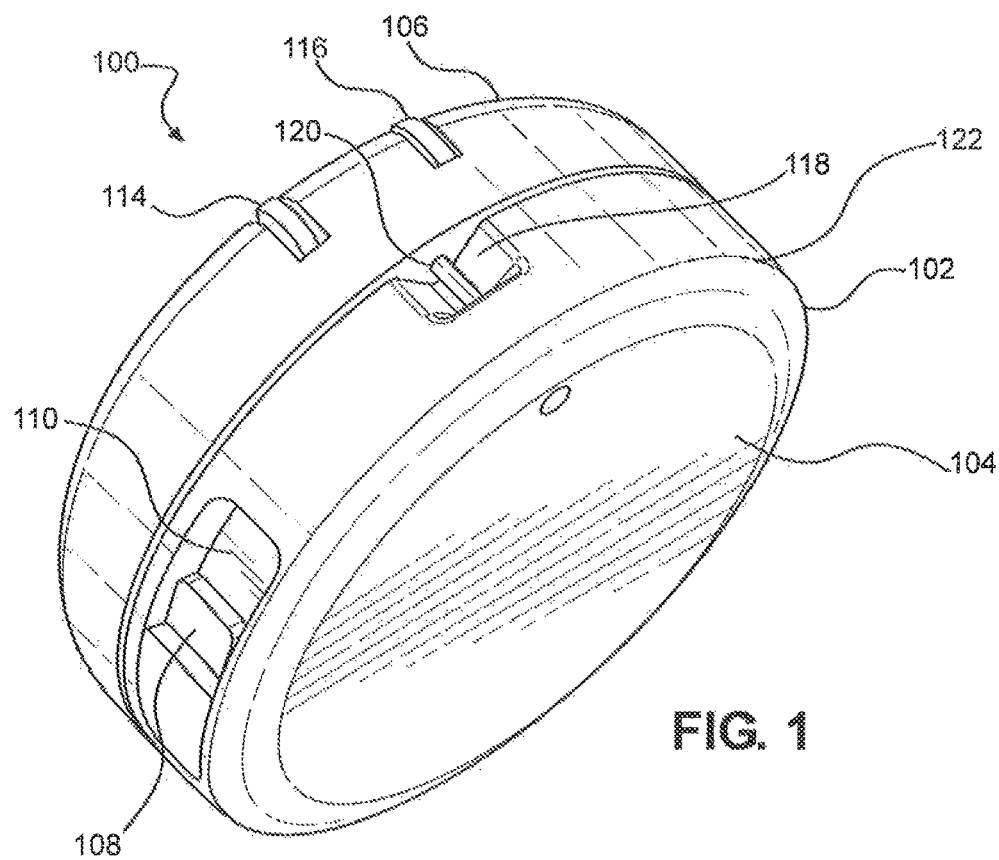
FIG. 1 is a perspective view of a mobile device charger with a foldable electrical plug and a retractable cord showing a front face on which a logo may be placed.

FIG. 1 illustrates a perspective view of a preferred embodiment of the present invention and includes mobile device charger 100 consisting of a body or enclosure 102, which in turn consists of a front face 104 and a rear face 106. A charging connector 108 rests in a recess 110 on the body when not in use. An electrical plug, consisting of prongs 114 and 116, also rests in a first configuration flush with the body when not in use, and extends outward into a second configuration in order to connect to an electrical outlet. Another recess 118 in the body, spanned by a rod 120, allows a chain to connect to the invention, permitting a clip or a keychain to connect the charger to a purse or a set of keys. Finally, a smooth edge 122, consisting of a bevel or curvature of the edges of the charger, allows the charger to be transported comfortably in a pocket or a purse without damaging other objects kept nearby.

Figure 2:
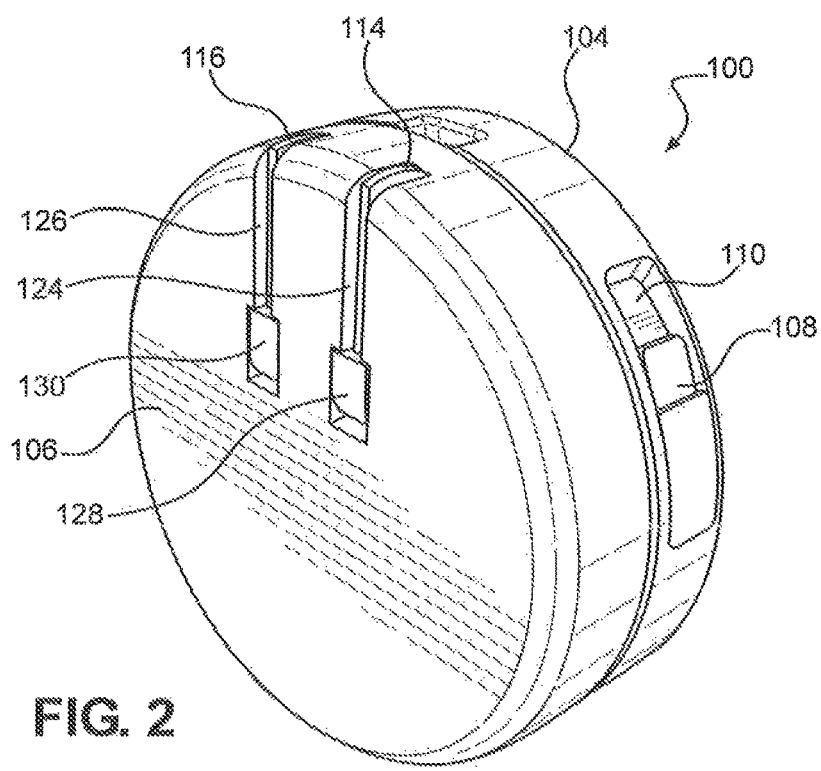
FIG. 2 is a perspective view of the mobile device charger with a foldable electrical plug and a retractable cord showing a rear face containing the foldable electrical plug.

FIG. 2 illustrates a perspective view a preferred embodiment of the invention showing the rear face 106. The prongs 114 and 116 of the electrical plug can be seen situated inside recesses 124 and 126 so as not to extend significantly beyond the body while at rest in their first configuration. Hinges 128 and 130 allow the prongs to be pulled outward into the extended second configuration, and thus to be connected to a standard electrical outlet. Although the plugs shown fit into the household outlets traditionally found in North America, they may be substituted by the appropriate shape of plugs for any region of the world for which the invention is manufactured.

Figure 3:
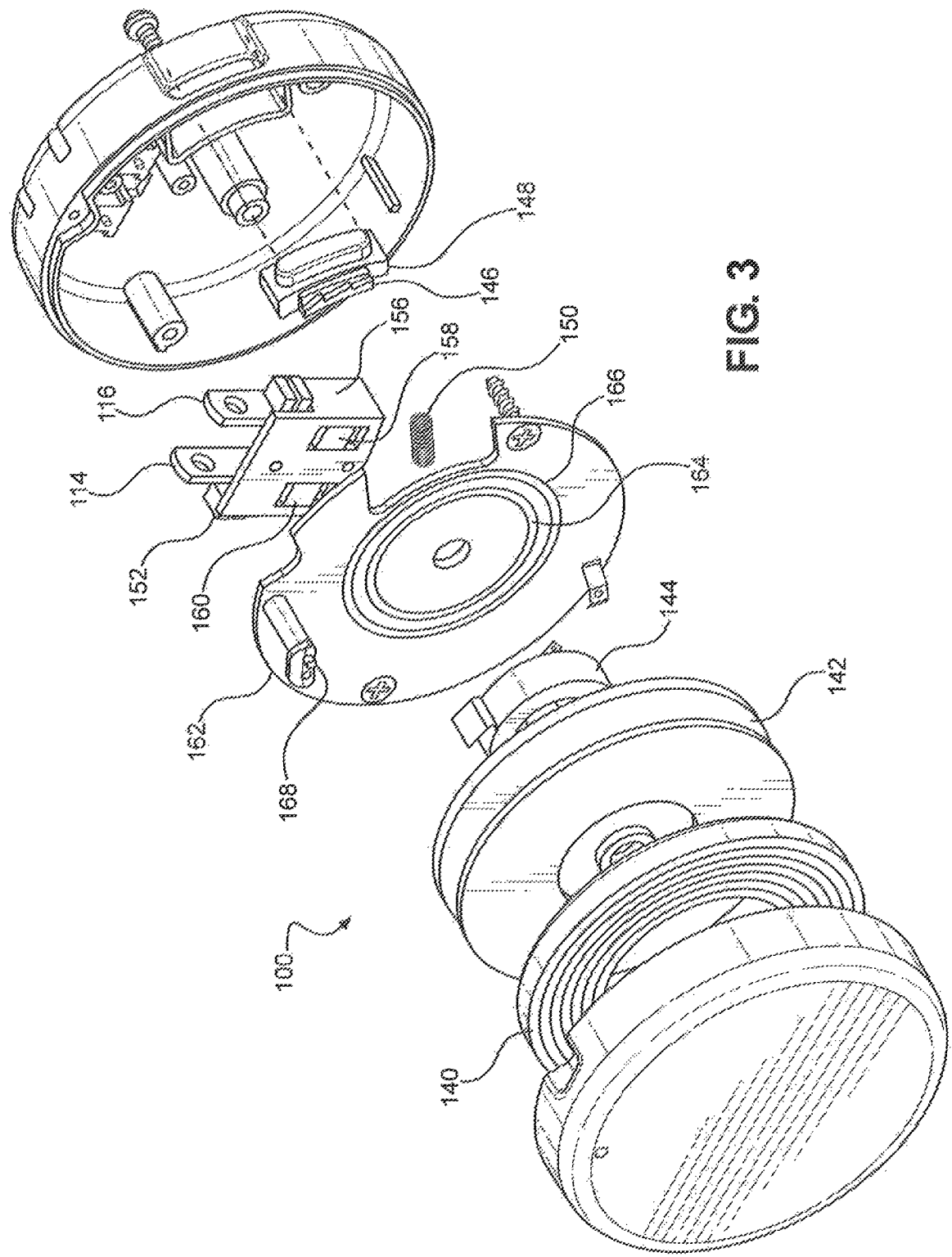
FIG. 3 is an exploded view of the mobile device charger showing how the various pieces may be connected in a preferred embodiment of the present invention.

FIG. 3 illustrates an exploded perspective view of a preferred embodiment of the invention. The cable 140 can be seen to fit inside the enclosure in a first configuration when not in use. It winds around a spool 142, while a spring 144 provides a torsional force which tends to keep the cable in its first configuration. However, when the cable is extended into a second configuration outside the enclosure in order to charge a portable electronic device, a pawl 146, consisting of a toothed edge connected to a button 148, sits against a toothed backside of the spool 142. The pawl together with the spool act as a ratchet allowing extension of the cable 140 into its second configuration, but preventing the spring 144 from retracting it back into its first configuration. The button 148 is normally held outward by a spring 150, but when pushed inward, the pawl 146 is disconnected from the spool 142, and the spring 144 then retracts the cable 140 into its first configuration.

A plug 152 is comprised of prongs 114 and 116, a housing 156, and contacts 158 and 160. The contacts allow for a consistent point of electrical contact with the board despite the fact that the plug itself is foldable. The plug is connected to a printed circuit board 162, which in turn provides current to the cable 140 via two slipjoint contacts 164 and 166. When current is being provided to a personal electronic device, a light-emitting diode 168 is activated, providing a visual signal that the connected device is being charged.

Figure 4:
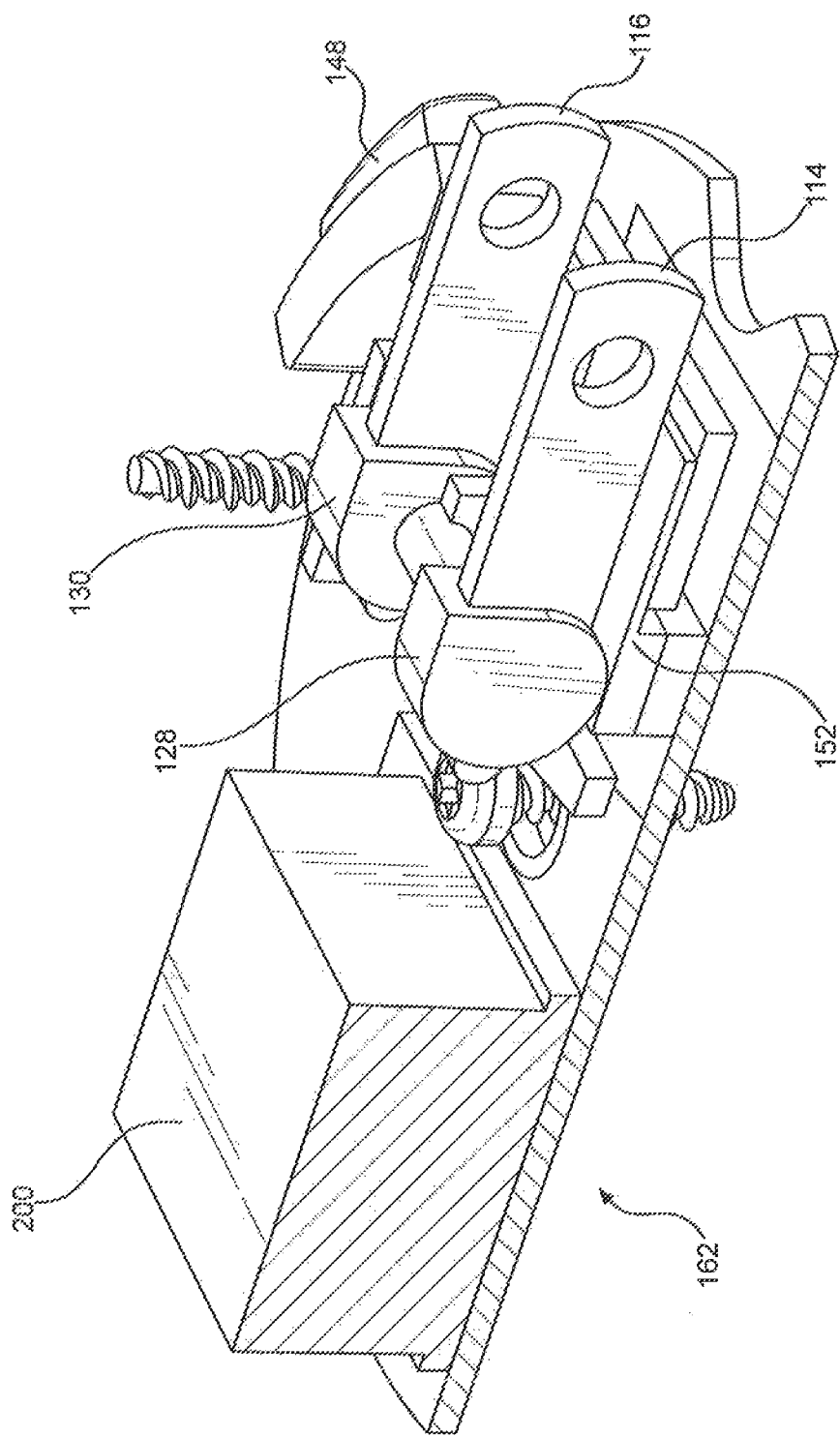
FIG. 4 shows a cutaway perspective of the printed circuit board used in a preferred embodiment of the present invention and to which the plug and AC/DC converter circuit is attached.

FIG. 4 illustrates the printed circuit board 162 to which the electrical plug 152 is connected, providing alternating current to the AC/DC converter circuit 200, which rectifies and transforms the current and in turn provides DC current to the cable 140 via slipjoint contacts 164 and 166.

Figure 5:
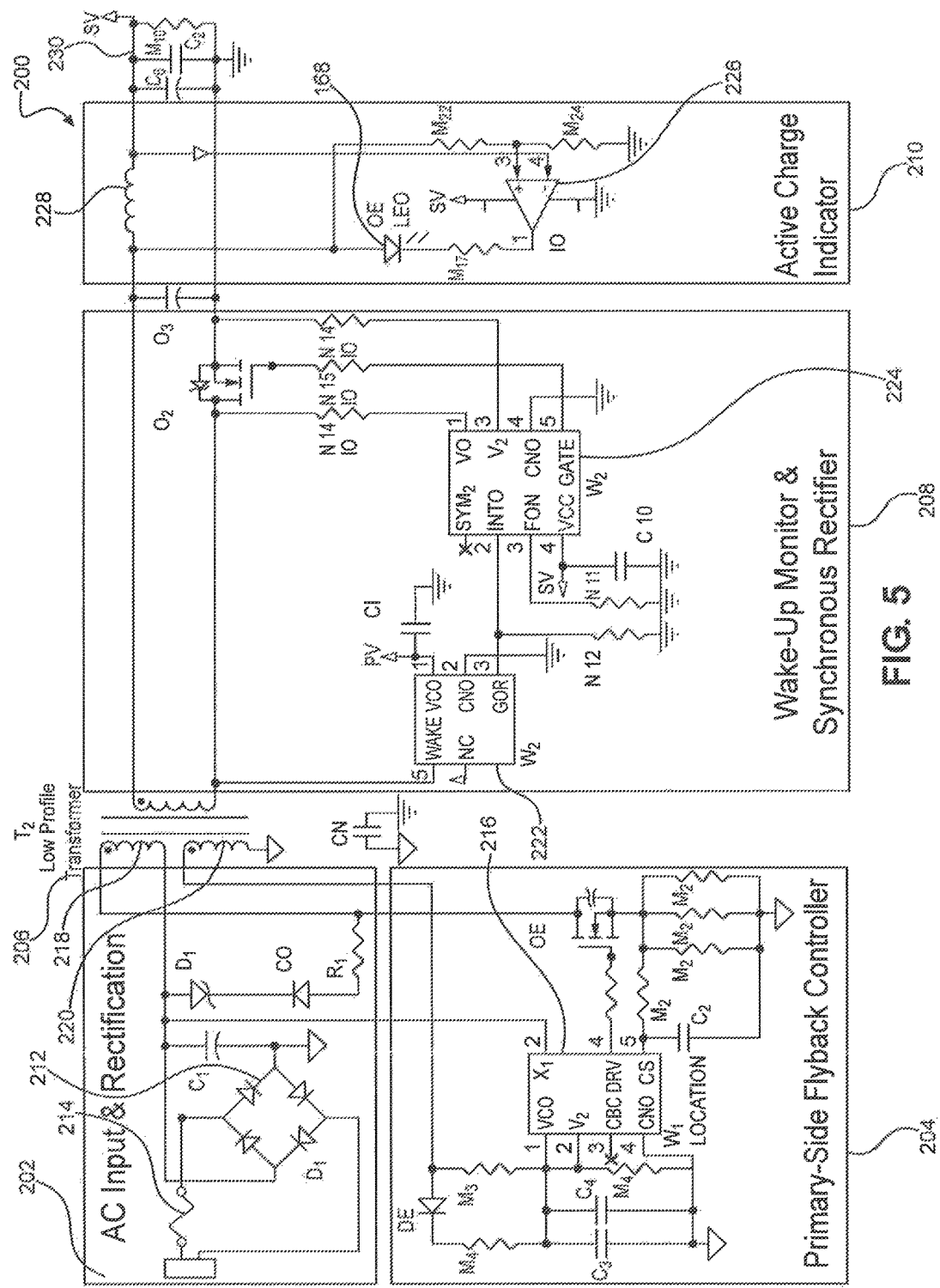
FIG. 5 shows the schematic of an AC/DC converter circuit in a preferred embodiment of the present invention.

FIG. 5 is a schematic of AC/DC converter circuit 200 as used in a preferred embodiment of the invention. The AC input is passed through initial rectifier 202 to a primary side flyback controller 204. A low-profile transformer 206 then steps down the voltage. A wake-up monitor and synchronous rectifier 208 on the secondary side of the transformer detects the presence or absence of a load, and signals the flyback controller 204 accordingly. The wake-up monitor and synchronous rectifier also acts as a near-ideal diode to rectify the current. An active charge indicator 210 detects when a personal electronic device is being charged and turns on light-emitting diode 168.

In the initial rectifier 202, prong 114 feeds one side of a diode bridge 212, while prong 116 feeds the other side through a protective fuse 214. The rectified current is provided to the flyback controller 204, which is based on a UCC28730 integrated circuit 216. The flyback controller switches the current through primary winding 218 of transformer 206, and monitors the current through auxiliary winding 220 of the transformer. The winding ratios of transformer 206 may differ in different embodiments of the invention intended for sale in different regions of the world, as appropriate to the standard household outlet voltage of the region.

When there is no load, wake-up monitor and synchronous rectifier 208, based on a UCC24650 integrated circuit 222, sends a series of pulses through the transformer signaling the flyback controller 204 to shut down, saving power when there is no device connected to the charger. A UCC24610 integrated circuit 224 provides the synchronous rectifier function, acting as a near-ideal diode providing high efficiency and low voltage or power loss.

Finally, active charge indicator 210 uses a comparator 226 provide a voltage difference across light-emitting diode 168 when a voltage drop across filter inductor 228 indicates an active device is connected. Light-emitting diode 168 thus indicates when a connected personal electronic device is being charged.

After the AC input is transformed and rectified, an attached personal electronic device is provided with current through 5-volt output 230.

Figure 6:
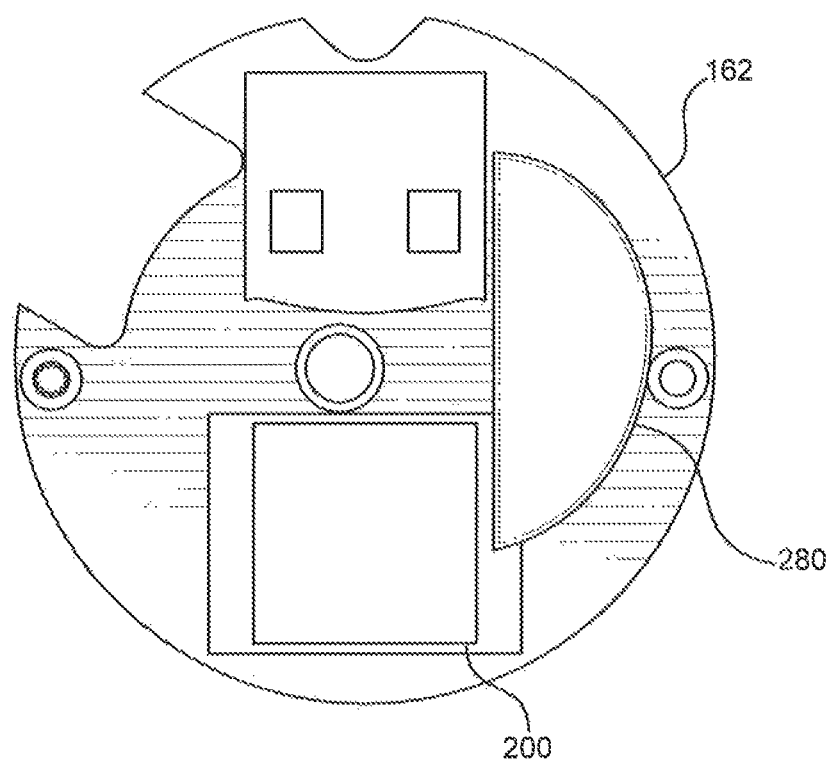
FIG. 6 shows a top view of the printed circuit board containing a battery in a preferred embodiment of the present invention.

FIG. 6 illustrates the use of a battery 280 in a preferred embodiment of the invention as a way to charge a personal electronic device when a power outlet is unavailable. The battery 280 is attached to the circuit board 162 and is charged by AC/DC converter circuit 200 when the charger 100 is connected to a power outlet. The battery 280 in turn provides current to a personal electronic device when one is connected to the charger 100.

Figure 7:
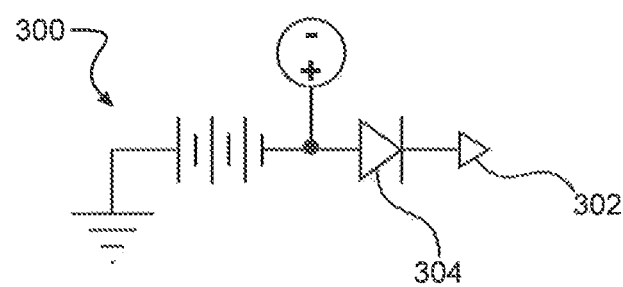
FIG. 7 shows the schematic of the connection of the battery to the AC/DC converter circuit in a preferred embodiment of the present invention.

FIG. 7 is a schematic illustrating circuit 300 which connects the internal battery 280 to the AC/DC converter circuit 200 and provides output to an attached personal electronic device. The 5-volt output 230 of the AC/DC converter circuit acts as a voltage source connected to the positive end of battery 280. Battery 280 provides its own 5-volt output 302 via a diode 304 to a personal electronic device when one is connected. The negative end of the battery 280 is connected to DC ground.

While the above is a description of various embodiments of the present invention, further modifications may be employed without departing from the spirit and scope of the present invention. Thus the scope of the invention should not be limited according to these factors, but according to the following claims.

What is claimed is:

1. A mobile device charger, comprising:
an enclosure comprising:
    a cylindrical shape defined by a first circular surface having a perimeter and connected to a second circular surface having a perimeter by a curved connecting surface having a first end at the perimeter of the first circular surface and a second end at the perimeter of the second circular surface, the perimeters of the first and second circular surface beveled at the connections to the curved connecting surface, and
    an electrical plug;
an AC/DC converter circuit, comprising:
    a rectifier,
    a flyback controller,
    a transformer,
    a wake-up monitor and synchronous rectifier, and
    an active charge indicator; and
a retractable cable with a charging connector extending out from the enclosure, which cable is able to be extended from the enclosure while in use and retracted into the enclosure for storage,
wherein the wake-up monitor and synchronous rectifier is configured to send a series of pulses through the transformer to signal the flyback controller to shut down when there is no mobile device connected to the mobile device charger.

2. A mobile device charger according to claim 1 wherein the electrical plug comprises a foldable electrical plug that, in a first configuration, sits flush with the enclosure and, in a second configuration, folds outward to connect to a power outlet.

3. A mobile device charger according to claim 1 with a pawl which holds the cable in a first configuration where the cable is extended from the enclosure until the cable is retracted into a second configuration inside the enclosure by a mechanism for displacing the pawl.

4. A mobile device charger, comprising:
an enclosure with a foldable electrical plug that, in a first configuration, sits flush with the enclosure and, in a second configuration, folds outward to connect to a power outlet;
a printed circuit board inside the enclosure and in electrical communication with the foldable electrical plug, the printed circuit board comprising an AC/DC converter circuit and two slipjoint contacts;
a retractable cable with a charging connector extending out from the enclosure, which cable is able to be extended from the enclosure while in use and retracted into the enclosure for storage; and
an internal battery,
wherein the printed circuit board is configured to provide current to the retractable cable via the two slipjoint contacts, and
wherein the AC/DC converter circuit comprises:

a rectifier;
a flyback controller;
a transformer;
a wake-up monitor and synchronous rectifier;
and an active charge indicator,
   wherein the wake-up monitor and synchronous rectifier is configured to send a series of pulses through the transformer to signal the flyback controller to shut down when there is no mobile device connected to the mobile device charger.

5. A mobile device charger according to claim 4 with a pawl which holds the cable in a first configuration where the cable is extended from the enclosure until the cable is retracted into a second configuration inside the enclosure by a mechanism for displacing the pawl.

6. A mobile device charger according to claim 4 having a cylindrical shape.

7. A mobile device charger according to claim 4 having beveled edges.

8. A mobile device charger, comprising:
an enclosure with a foldable electrical plug and beveled edges;
an AC/DC converter circuit, comprising:
   a rectifier,
   a flyback controller,
   a transformer,
   a wake-up monitor and synchronous rectifier, and
   an active charge indicator;
a retractable cable with a charging connector extending out from the enclosure, which cable is able to be extended from the enclosure while in use and retracted into the enclosure for storage; and
a connector on the enclosure configured to connect to a chain,
   wherein the wake-up monitor and synchronous rectifier is configured to send a series of pulses through the transformer to signal the flyback controller to shut down when there is no mobile device connected to the mobile device charger.

9. A mobile device charger according to claim 8 with a foldable electrical plug that, in a first configuration, sits flush with the enclosure and, in a second configuration, folds outward to connect to a power outlet.

10. A mobile device charger according to claim 8 with a pawl which holds the cable in a first configuration where the cable is extended from the enclosure until the cable is retracted into a second configuration inside the enclosure by a mechanism for displacing the pawl.

11. A mobile device charger according to claim 8 having a cylindrical shape.

12. A mobile device charger according to claim 8 having an internal battery.

13. A mobile device charger according to claim 8 having a clip attached to the charger via a chain connected on one end to the clip and on the other end to the connector in the enclosure.

* * * * *